(12) United States Patent
Kumano et al.

(10) Patent No.: US 7,957,887 B2
(45) Date of Patent: Jun. 7, 2011

(54) ENGINE CONTROLLER

(75) Inventors: Kengo Kumano, Hitachi (JP); Hiromu Kakuya, Hitachinaka (JP); Shiro Yamaoka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 349 days.

(21) Appl. No.: 12/116,733

(22) Filed: May 7, 2008

(65) Prior Publication Data

US 2008/0281497 A1 Nov. 13, 2008

(30) Foreign Application Priority Data

May 9, 2007 (JP) .................................. 2007-124057

(51) Int. Cl.
*B60T 7/12* (2006.01)

(52) U.S. Cl. ......... 701/103; 123/344; 123/376; 123/403

(58) Field of Classification Search .......... 701/102–105; 123/27 R, 295, 305, 299, 324, 344, 360, 361, 123/376, 403

See application file for complete search history.

(56) References Cited

U.S. PATENT DOCUMENTS

| | | | | |
|---|---|---|---|---|
| 6,739,295 B1 * | 5/2004 | Yamaoka et al. | .......... | 123/90.15 |
| 6,971,338 B2 * | 12/2005 | Kobayashi et al. | ............. | 123/21 |
| 7,089,913 B2 * | 8/2006 | Yamaoka et al. | ........ | 123/406.48 |
| 7,314,041 B2 * | 1/2008 | Ogawa et al. | ............. | 123/568.14 |
| 7,367,317 B2 * | 5/2008 | Miyazaki et al. | ............. | 123/431 |
| 7,438,045 B2 * | 10/2008 | Herweg et al. | ................. | 123/295 |
| 2003/0226528 A1 * | 12/2003 | Yamaoka et al. | ........... | 123/90.15 |

FOREIGN PATENT DOCUMENTS

| | | |
|---|---|---|
| JP | 10-9011 A | 1/1998 |
| JP | 2004-36575 A | 2/2004 |
| JP | 2004-293471 A | 10/2004 |
| JP | 2006-274951 A | 10/2006 |
| JP | 2006-336511 A | 12/2006 |
| JP | 2007-77919 A | 3/2007 |

\* cited by examiner

*Primary Examiner* — John T Kwon
(74) *Attorney, Agent, or Firm* — Crowell & Moring LLP

(57) ABSTRACT

In an engine controller capable of carrying out spark ignition type combustion and compressed self-ignition type combustion, in order to suppress operation performance deterioration and exhaust performance deterioration at the time of switching a combustion mode from the compressed self-ignition type combustion to the spark ignition type combustion, intake pipe pressure downstream a throttle is quickly reduced by making the throttle opening degree smaller than a target throttle opening degree of the spark ignition type combustion immediately after switching for a certain period during the combustion mode is switched from the compressed self-ignition type combustion to the spark ignition type combustion. As a result, responsiveness of an intake amount at the time of switching the combustion mode from the compressed self-ignition type combustion to the spark ignition type combustion is enhanced, and combustion switching without exhaust deterioration and torque variation is realized.

6 Claims, 14 Drawing Sheets

ENGINE CONTROLLER

BACKGROUND OF THE INVENTION

1. Field of the Invention

The present invention relates to an engine controller capable of switching combustion modes between compressed self-ignition type combustion and spark ignition type combustion.

2. Description of Related Art

In internal combustion engines (hereinafter, engines) used for automobiles and the like, a compressed self-ignition type gasoline engine (hereinafter, a compressed self-ignition engine) which compresses an air-fuel mixture to cause self-ignition combustion (hereinafter, compressed self-ignition type combustion) attracts attention as the one which provides improvements in fuel efficiency and exhaust performance at the same time. As compared with spark ignition type combustion in which an air-fuel mixture is ignited by spark of an ignition plug and combusted, the compressed self-ignition engine can reduce a fuel consumption rate by increase in efficiency due to high compression, reduction of pump loss due to lean-burn, and improvement in degree of constant volume due to rapid combustion, and can reduce an NOx concentration in exhaust gas due to a low combustion temperature. Therefore, the compressed self-ignition engine can realize both fuel efficiency and exhaust performance at the same time.

When the compressed self-ignition engine is applied to an automobile, it is proposed to carry out both of spark ignition type combustion and compressed self-ignition type combustion by switching them to realize engine torque required by a driver.

As a document which discloses the art relating to switching of the combustion mode from the compressed self-ignition type combustion to the spark-ignition type combustion, JP-A-2006-274951 and JP-A-2004-36575 are cited.

JP-A-2006-274951 discloses the art which improves response delay of an intake amount by controlling the timing of an intake valve (intake valve closing time) in accordance with intake pipe pressure during a response delay period of the intake amount in throttle control when switching the combustion mode from the compressed self-ignition type combustion to the spark ignition type combustion, so that the combustion switching is realized without torque variation and exhaust deterioration.

JP-A-2004-36575 discloses the art which controls a fuel injection amount and ignition time in accordance with the intake pipe pressure during a response delay period of the intake amount in throttle control when switching the combustion mode from the compressed self-ignition type combustion to the spark ignition type combustion, so that the combustion switching is realized without torque variation.

BRIEF SUMMARY OF THE INVENTION

When switching the spark ignition type combustion in which combustion is mainly performed with a stoichiometric mixture ratio (stoichiometry), and the compressed self-ignition type combustion in which lean-burn is mainly performed, the intake air amount (hereinafter, the intake amount) needs to be quickly changed. The intake amount is mainly controlled by a throttle placed at an intake pipe. When switching from the spark-ignition type combustion to the compressed self-ignition type combustion, by increasing a throttle opening degree stepwise, air at an atmospheric pressure flows from an upstream side of the throttle to a downstream side, and the intake amount quickly increases. On the other hand, when switching from the compressed self-ignition type combustion to the spark ignition type combustion, even after the throttle opening degree is decreased stepwise, the intake pipe pressure is not reduced until the air remaining downstream of the throttle is taken into the engine, and therefore, significant response delay of the intake amount occurs.

Further, at the time of the compressed self-ignition type combustion, the temperature inside a cylinder at a compression end needs to be at a self-ignition temperature or more of a fuel, and therefore, a large mass of internal EGR is introduced. Accordingly, when switching the combustion mode from the compressed self-ignition type combustion to the spark ignition type combustion, the mass of internal EGR needs to be decreased, and therefore the intake amount increases by the decreased amount of the internal EGR.

For the above reasons, there is the problem that an excess air state is brought about at the time of the spark ignition type combustion immediately after switching from the compressed self-ignition type combustion to the spark ignition type combustion, which causes exhaust deterioration and torque variation at the time of switching of the combustion.

The present invention is made in view of the problem as described above, and the object thereof is to provide an engine controller capable of smoothly carrying out switching from the compressed self-ignition type combustion to the spark ignition type combustion.

According to the invention, there is provided a controller for controlling a throttle opening degree of an internal combustion engine, which is capable of switching a combustion mode of the internal combustion engine from compressed self-ignition type combustion to spark ignition type combustion, wherein within a predetermined period before and/or after switching the combustion state of the internal combustion engine from the compressed self-ignition type combustion to the spark ignition type combustion, the controller controls the throttle opening degree of the internal combustion engine so as to be smaller than a throttle opening degree 1 which is set by the controller when engine torque and engine speed by which the compressed self-ignition type combustion is switched to the spark ignition type combustion are realized in the spark ignition type combustion.

According to the present invention, the responsiveness of the intake amount is enhanced at the time of switching from the compressed self-ignition type combustion to the spark ignition type combustion, so that smooth transition of the combustion modes becomes possible.

Other objects, features and advantages of the invention will become apparent from the following description of an embodiment of the invention taken in conjunction with the accompanying drawings.

DETAILED DESCRIPTION OF THE INVENTION

An engine controller of one embodiment according to the present invention is an engine controller capable of carrying out compressed self-ignition type combustion and spark ignition type combustion by switching them, and is characterized by providing, when switching a combustion mode from the compressed self-ignition type combustion to the spark ignition type combustion at a predetermined engine torque and a predetermined engine speed, a period 1 in which a throttle opening degree which is an opening degree of a throttle provided in an intake pipe of the internal combustion engine and capable of regulating an air amount flowing into a combustion chamber of the internal combustion engine is made smaller than a throttle opening degree 1 which is set when realizing the above engine torque and the above engine speed only by the spark ignition type combustion without carrying out combustion switching.

By such a configuration, the intake pipe pressure is quickly reduced when switching the compressed self-ignition type combustion to the spark ignition type combustion, whereby responsiveness of the intake amount is enhanced, and torque variation and exhaust deterioration in the spark ignition type combustion immediately after the switching can be suppressed.

Further, another mode of the engine controller of one embodiment according to the present invention is characterized in that when carrying out the combustion switching from the compressed self-ignition type combustion to the spark ignition type combustion, the period 1 in which the throttle opening degree is made smaller than the throttle opening degree 1 is provided after carrying out the above described compressed self-ignition type combustion which is set at a throttle opening degree 3 within the range of a throttle opening degree 2 which is a set-value of the throttle opening degree set in the compressed self-ignition type combustion and the throttle opening degree 1 in the spark ignition type combustion.

By decreasing the intake amount in advance at the time of the compressed self-ignition type combustion before the combustion switching by such a configuration, change of the intake amount at the time of the combustion switching to the spark ignition type combustion can be suppressed to be small, and therefore, the risk of torque variation and exhaust deterioration in the spark ignition type combustion immediately after combustion switching can be suppressed to a minimum.

Hereinafter, embodiments according to the present invention will be described in detail more.

Figure 1:
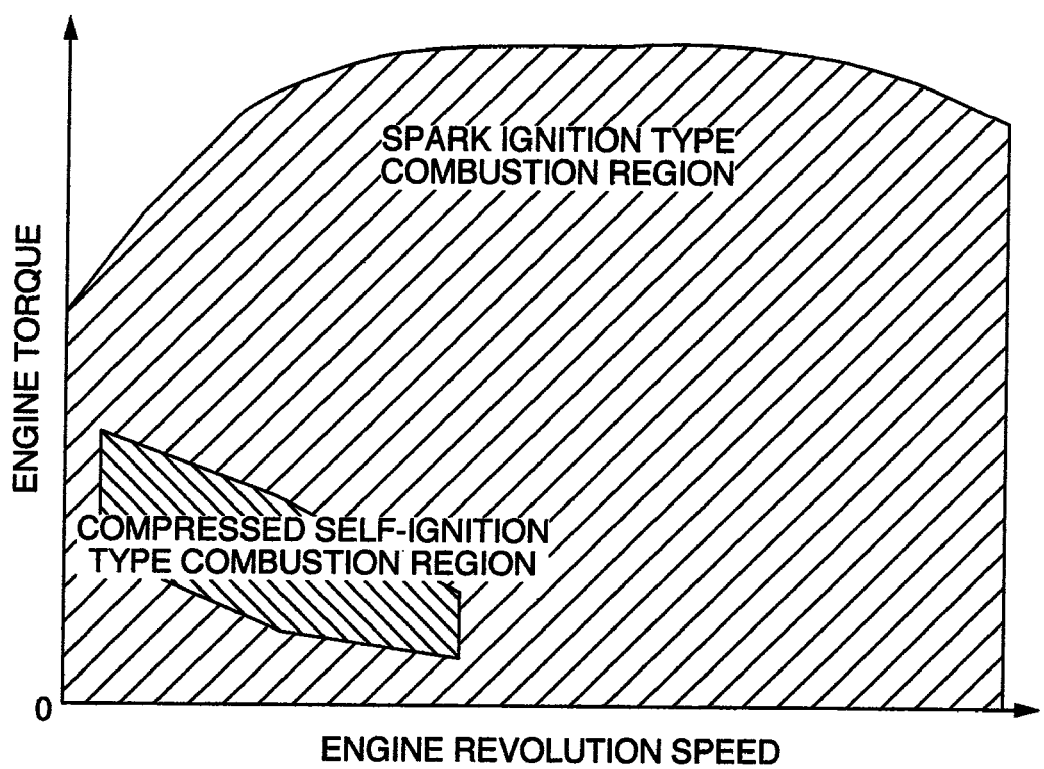
FIG. 1 is a diagram showing operation regions or a switchable region of spark ignition type combustion and compressed self-ignition type combustion.

For carrying out compressed self-ignition type combustion, there are means such as intake air heating, higher compression rate, and introduction of internal EGR. However, considering cost and operation during spark-ignition type combustion, the introduction of internal EGR by manipulating valve timing is one of the means with high possibility. At the time of compression self-ignition type combustion by the internal EGR introduction, the mass of internal EGR inside a combustion chamber needs to be made large. Thereby, because the new air amount which flows into the cylinder is restrained, and a limited time period is required for chemical reaction from formation of an air-fuel mixture until combustion, in the case of a natural aspiration engine, the compressed self-ignition type combustion can be realized in the operation state with a low load and a low engine speed as shown in FIG. 1.

Hereinafter, the embodiments of the present invention will be described based on the drawings.

Figure 2:
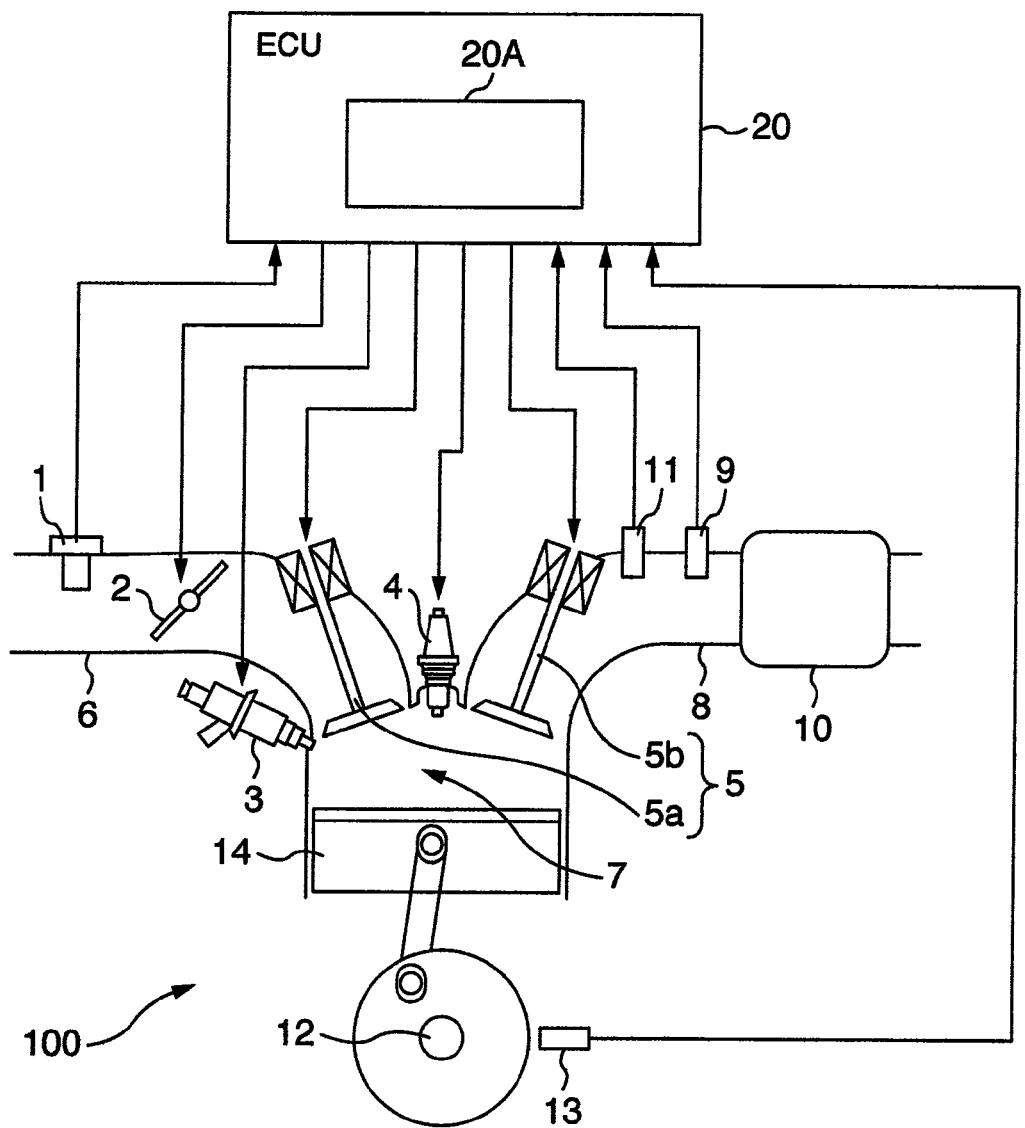
FIG. 2 is a system configuration diagram in the case of applying an engine controller which is a first embodiment of the present invention to a cylinder injection engine.

FIG. 2 shows a first embodiment of the present invention, and is a system configuration diagram in which a controller of a compressed self-ignition type internal combustion engine of the embodiment is applied to an automobile gasoline engine.

An engine 100 is an engine capable of carrying out spark ignition type combustion and compressed self-ignition type combustion. In the engine 100, an air flow sensor 1 which measures the amount of intake air and an electronically controlled throttle 2 which regulates the intake flow rate are included at respective proper positions of an intake pipe 6. Further, in the engine 100, an injector 3 which injects a fuel into a combustion chamber enclosed by a cylinder 7 and a piston 14, an ignition plug 4 which supplies ignition energy, and a variable valve 5 configured by an intake valve 5a which regulates intake gas flowing into the cylinder and an exhaust valve 5b which regulates exhaust gas exhausted from the inside of the cylinder are included at respective proper positions of the cylinder 7. By regulating the variable valve 5, the mass of internal EGR in the cylinder is regulated. Further, a three way catalyst 10 which purifies exhaust gas, an air-fuel ratio sensor 9 which is one mode of an air-fuel ratio detector and detects the air-fuel ratio of exhaust gas at an upstream side of the three way catalyst 10, and an exhaust temperature sensor 11 which is one mode of an exhaust temperature detector and measures the temperature of exhaust gas at the upstream side of the three way catalyst 10 are included at respective proper positions of an exhaust pipe 8. Further, a crank angle sensor 13 for calculating a rotational angle is included at a crankshaft 12.

Signals obtained from the air flow sensor 1, the air-fuel ratio sensor 9, the exhaust temperature sensor 11 and the crank angle sensor 13 are sent to a control unit (hereinafter, called an ECU 20). While it is not clearly illustrated in the drawing, a signal obtained from a sensor (hereinafter, required torque detecting sensor) which detects required torque for the engine is sent to the ECU 20, and in the ECU 20, the required torque is calculated based on an output signal of the required torque detecting sensor. The required torque detecting sensor indicates an accelerator opening degree sensor in the case of an automobile with an engine mounted thereon, for example. Further, the ECU 20 calculates the engine revolution speed based on the output signal of the crank angle sensor 13. Based on the operation state of the engine obtained from the output of the above described various sensors, the air flow rate, the fuel injection amount and the main manipulated variables of the engine at the ignition time are optimally calculated.

The fuel injection amount calculated in the ECU 20 is converted into a valve opening pulse signal, and is sent to the injector 3. An ignition plug drive signal is sent to the ignition plug 4 so as to ignite the ignition plug 4 at the ignition time calculated in the ECU 20. Further, the throttle opening degree calculated in the ECU 20 is sent to the electronically controlled throttle 2 as a throttle drive signal. Further, the manipulated variable of the variable valve calculated in the ECU 20 is sent to the variable valve 5 as a variable valve drive signal.

Figure 3:
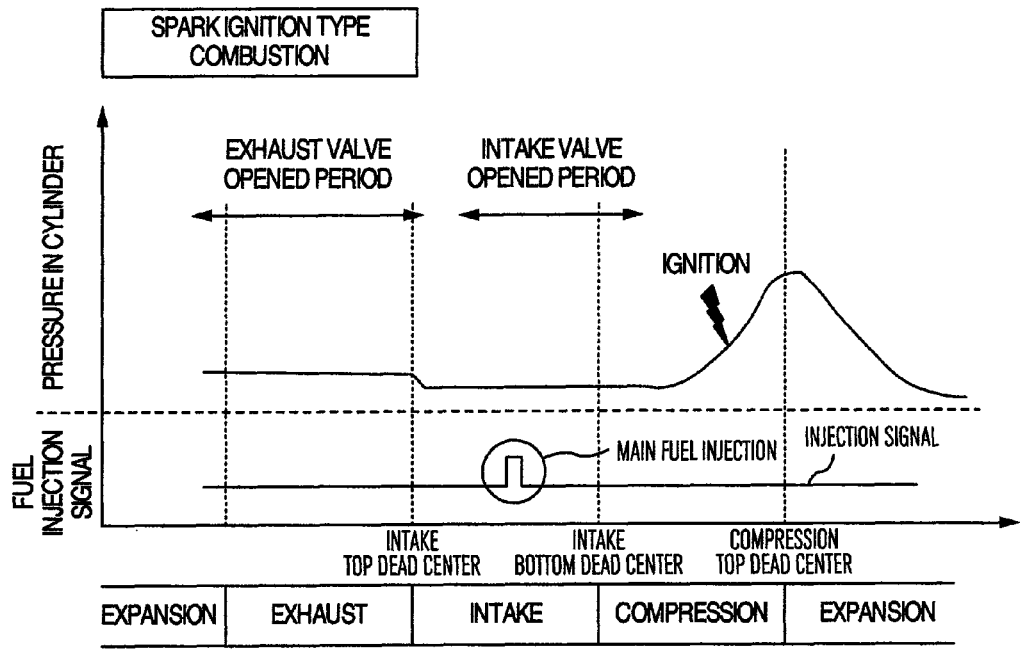
FIG. 3 is a diagram showing a pressure profile and fuel injection timing of one cycle at the time of spark ignition type combustion by the engine controller which is the first embodiment of the present invention.

On the occasion of carrying out spark ignition type combustion, a fuel is injected to air flowing into the cylinder 7 from the intake pipe 6 through the intake valve 5a (main fuel injection), and an air-fuel mixture is formed. The air-fuel mixture explodes by spark generated from the ignition plug 4 at a predetermined ignition time, and presses down the piston by the combustion pressure to cause a drive force of the engine. Further, the exhaust gas after explosion is sent to the three way catalyst 10 through the exhaust pipe 8, the exhaust components are purified inside the three way catalyst 10, and are discharged to the outside. FIG. 3 shows a general outline of the operation of the engine 100 at the time of spark ignition type combustion.

Figure 4:
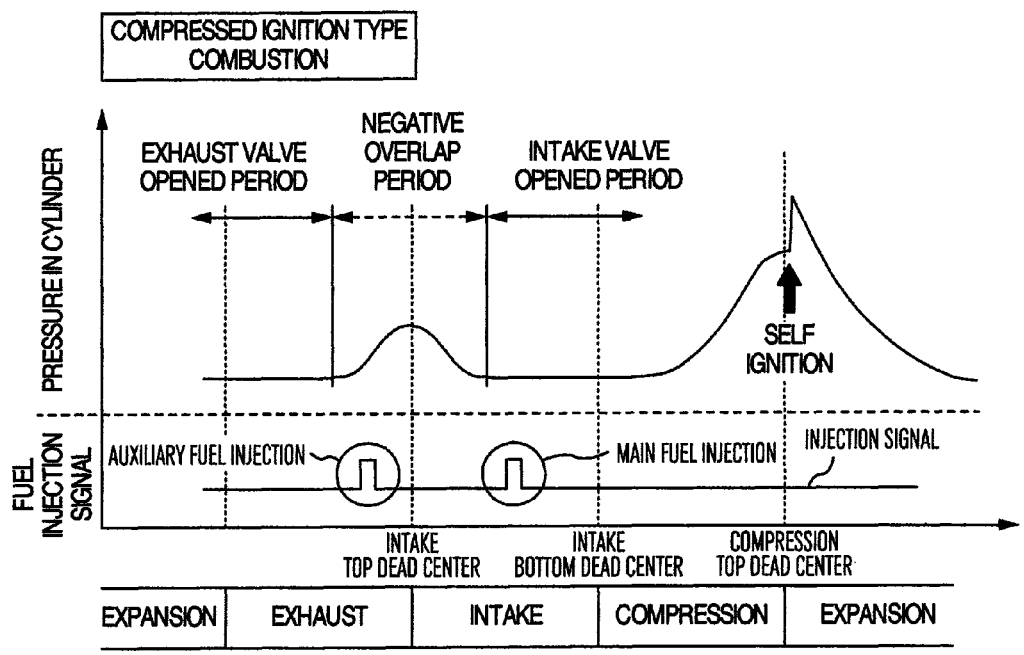
FIG. 4 is a diagram showing a pressure profile and fuel injection timing of one cycle at the time of compressed self-ignition type combustion by the engine controller which is the first embodiment of the present invention.

On the occasion of carrying out the compressed self-ignition type combustion, a negative overlap period in which the variable valve 5 (the intake valve 5a and the exhaust valve 5b) is in a closed state is provided during the exhaust stroke to allow the internal EGR to remain inside the cylinder 7, and during this period, the fuel is injected from the injector 3 (auxiliary fuel injection), whereby the fuel is reformed, and an ignition agent is generated. Further, in the intake stroke, air flows into the cylinder 7 from the intake pipe 6 through the intake valve 5a, fuel injection (main fuel injection) is carried out again to form an air-fuel mixture, the mixture is exploded by compression of the piston, and the piston is pressed down by the combustion pressure to be a drive force of the engine. Thereafter, as in the spark ignition type combustion, the exhaust gas is purified by the three way catalyst 10 and is discharged to the outside. FIG. 4 shows a general outline of an operation of the engine 100 at the time of the compressed self-ignition type combustion.

Figure 5:
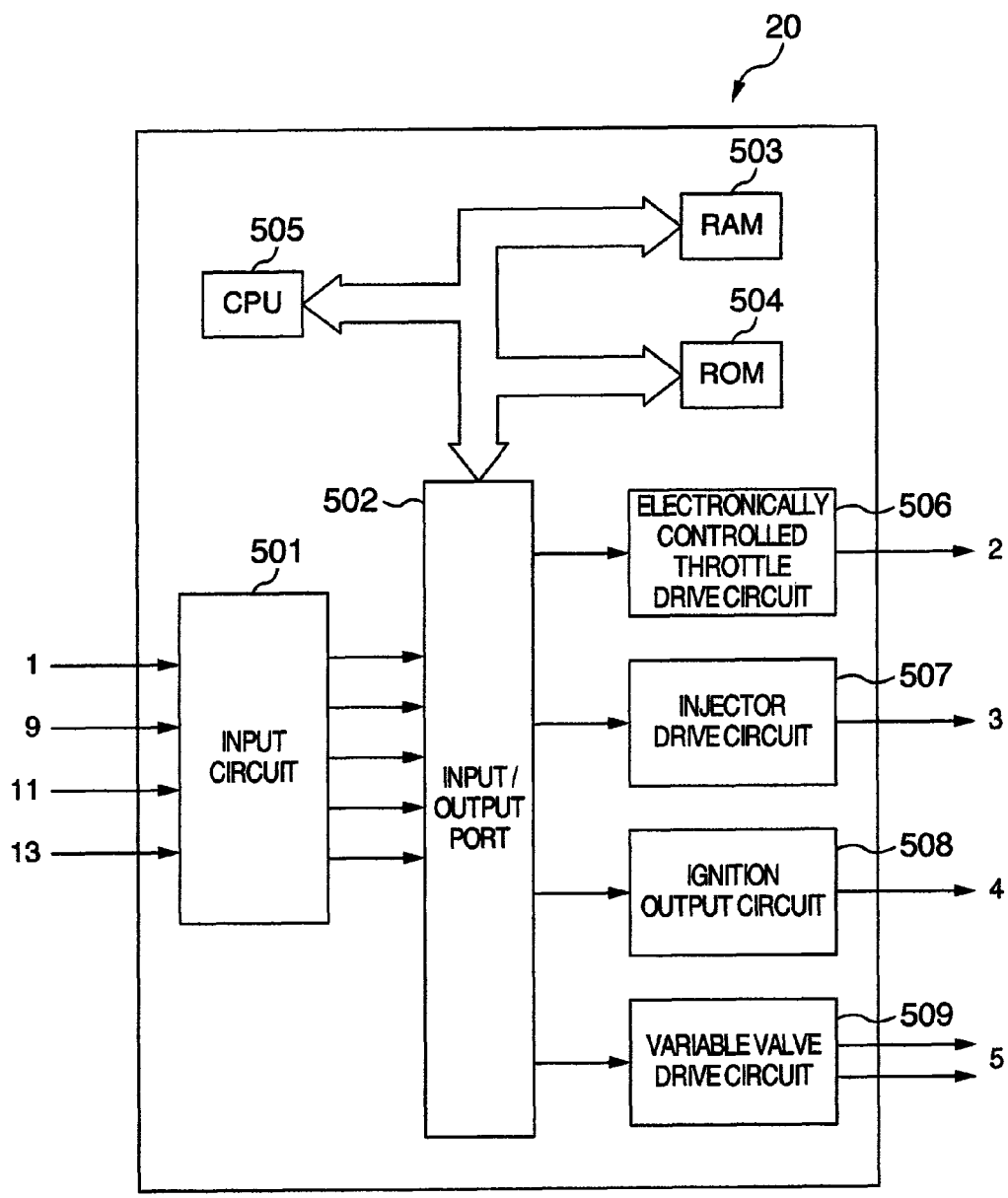
FIG. 5 is an internal configuration diagram of an ECU in the first embodiment of the present invention.

FIG. 5 shows the inside of the ECU 20. In the ECU 20, the output signals of the air flow sensor 1, the air-fuel ratio sensor 9, the exhaust temperature sensor 11 and the crank angle sensor 13 are inputted into an input circuit 501. However, the input signals are not limited to them. The input signal of each of the sensors which is inputted is sent to an input port inside an input/output port 502. The values sent to the input port is stored in a RAM 503, and arithmetically processed in a CPU 505. A control program in which the arithmetic processing contents are described is written in a ROM 504 in advance. The value indicating the manipulated variable of each actuator calculated in accordance with the control program is stored in the RAM 503, and thereafter, sent to an output port in the input/output port 502, and is sent to each actuator via each drive circuit. In the case of the present embodiment, there are an electronic throttle circuit 506, an injector drive circuit 507, an ignition output circuit 508, and a variable valve drive circuit 509 as the drive circuits. The respective circuits control the drive of the electronic control throttle 2, the injector 3, the ignition plug 4 and the variable valve 5, respectively.

The ECU 20 includes a combustion mode switching part 20A which carries out combustion mode switching between the compressed self-ignition type combustion and the spark ignition type combustion. By the combustion mode switching part of the present embodiment, operation performance deterioration and exhaust performance deterioration at the time of switching the combustion mode can be prevented. Hereinafter, the combustion mode switching control from the compressed self-ignition type combustion to the spark ignition type combustion by the combustion mode switching part 20A will be described. The combustion mode switching part 20A according to the present embodiment especially enhances the responsiveness of the intake amount by controlling the throttle so as to reduce the intake pipe pressure quickly at the time of switching the combustion mode, and smoothly carries out the switching from the compressed self-ignition type combustion to the spark ignition type combustion. As a result, torque variation and increase in the exhaust gas component at the time of the combustion mode switching are reduced.

Figure 6:
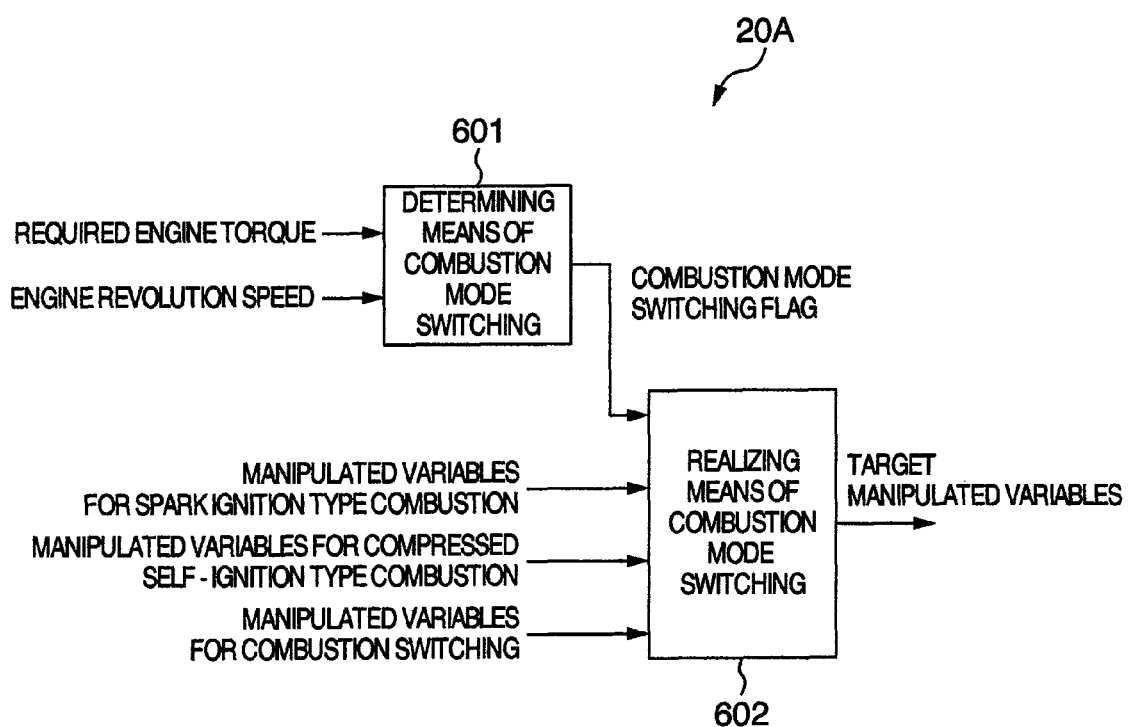
FIG. 6 is a control block diagram of a combustion mode switching part 20A in FIG. 2 in the first embodiment of the present invention.

FIG. 6 is a control block diagram of the combustion mode switching control by the combustion mode switching part 20A. The combustion mode switching part 20A includes a determining means 601 of combustion mode switching, and a realizing means 602 of combustion mode switching which switches the manipulated variables of the engine 100 for switching of the combustion mode.

The combustion mode switching determining means 601 determines whether or not switching of the combustion mode is possible based on the required engine torque and engine revolution speed required of the engine 100, and after setting a combustion mode switching flag, the combustion mode switching determining means 601 outputs it to the combustion mode switching realizing means 602. For example, the combustion mode switching determining means 601 includes a map showing the operation state of the engine 100 based on the engine torque and the engine revolution speed as shown in FIG. 1. In accordance with the required engine torque and engine revolution speed, the combustion mode switching determining means 601 determines that the compressed self-ignition type combustion can be carried out if the operational state is such that the compressed self-ignition type combustion can be carried out, based on the operation state map in FIG. 1, and sets the combustion mode switching flag at ON (=1). On the other hand, in the operation state in which the compressed self-ignition type combustion cannot be carried out, the combustion mode switching determining means 601 determines that the spark ignition type combustion needs to be carried out, and sets the combustion mode switching flag at OFF (=0).

The combustion mode switching realizing means 602 determines the target manipulated variables for controlling the engine 100 based on the combustion mode switching flag which is the output of the combustion mode switching determining means 601. The target manipulated variables are selected from the manipulated variables for the spark ignition type combustion, the manipulated variables for the compressed self-ignition type combustion, and the manipulated variables for combustion switching base on the combustion mode switching flag. More specifically, when the combustion mode switching flag is OFF (=0), in order to carry out the spark ignition type combustion, the manipulated variables for the spark ignition type combustion are set as the target manipulated variables. When the combustion mode switching flag is ON (=1), in order to carry out the compressed self-ignition type combustion, the manipulated variables for the compressed self-ignition type combustion are set as the target manipulated variables. Further, when the combustion mode switching flag is switched from ON (=1) to OFF (=0) while the compressed self-ignition type combustion is carried out, in order to switch the combustion mode from the compressed self-ignition type combustion to the spark ignition type combustion, the manipulated variables for combustion switching are set as the target manipulated variables, and thereafter, the manipulated variables for the spark ignition type combustion are set as the target manipulated variables. However, when the combustion mode switching flag is switched from OFF (=0) to ON (=1) while the combustion switching control is carried out, the combustion mode is not switched to the compressed self-ignition type combustion, but the manipulated variables for combustion switching are set as the target manipulated variables in order to continue the combustion switching control to the spark ignition type combustion.

Here, the above described manipulated variables mean the opening degree of the throttle 2 (throttle opening degree), the fuel injection pulse width and the fuel injection timing for the injector 3, the ignition timing for the ignition plug 4, the opening and closing timing of the intake valve 5a and the opening and closing timing of the exhaust valve 5b, which are manipulated when the engine 100 is controlled.

Figure 7:
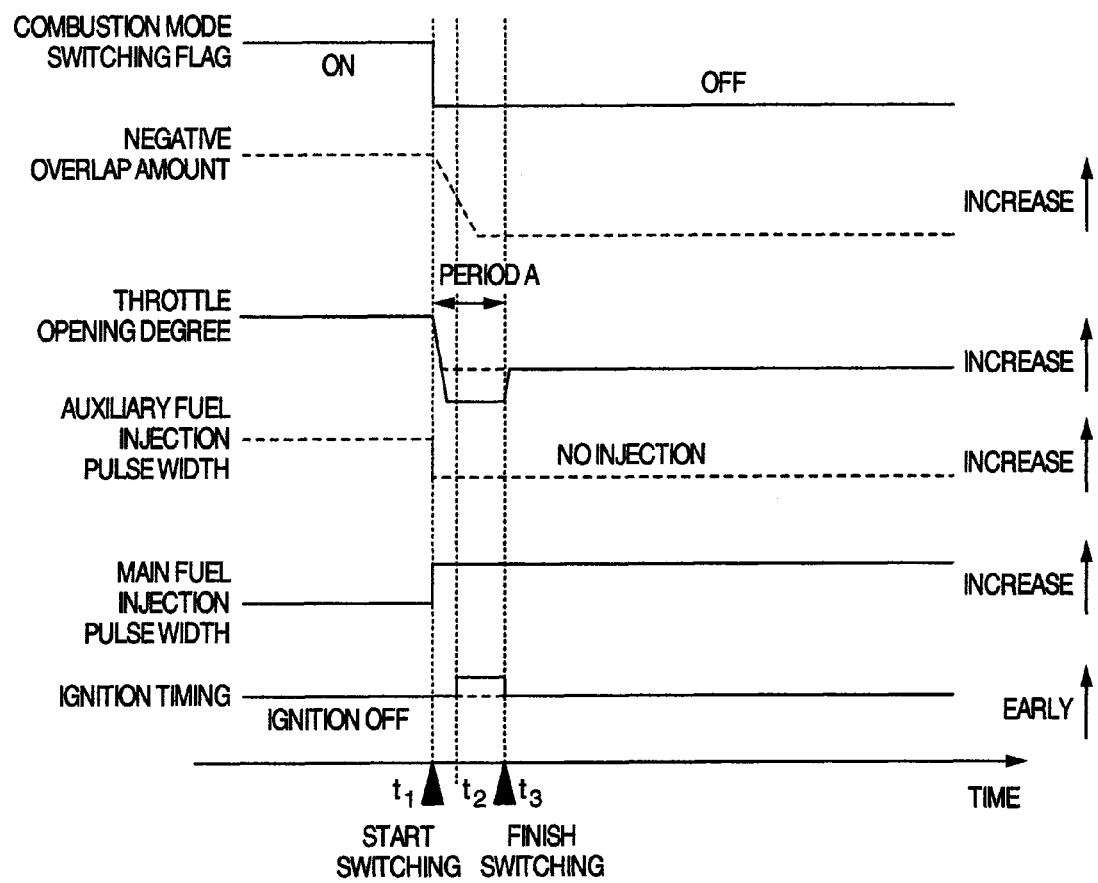
FIG. 7 is a time chart diagram of the combustion mode switching flag, the negative overlap amount, the throttle opening degree, the auxiliary fuel injection pulse width, the main fuel injection pulse width and the ignition signal when carrying out the switching of the combustion mode from the compression self-ignition type combustion to the spark ignition type combustion in the first embodiment of the present invention.

Hereinafter, one example of the combustion mode switching control from the compressed self-ignition type combustion to the spark ignition type combustion by the combustion mode switching part 20A will be shown. FIG. 7 shows the combustion mode switching flag, the negative overlap amount, the throttle opening degree, the auxiliary fuel injection pulse width, the main fuel injection pulse width and ignition timing at the time of carrying out the combustion mode switching control along the time sequence (the combustion mode switching flag ON (=1), the negative overlap period increasing, the throttle opening degree being large, the auxiliary fuel injection pulse width increasing, the main fuel injection pulse width increasing, and the ignition timing being early are shown in order upward in the drawing). Further, the broken line shows the case in which the manipulated variables are simply switched with the timing of time $t_1$ when switching from the compressed self-ignition type combustion to the spark ignition type combustion (simple switching control), and the solid line shows the case in which the combustion mode switching control of the present embodiment is applied. The time $t_1$ represents the time at which the combustion mode switching control is started from the compressed self-ignition type combustion, $t_2$ represents the time at which the combustion mode is switched from the compressed self-ignition type combustion to the spark ignition type combustion, and $t_3$ represents the time at which a series of the combustion switching control to the spark ignition type combustion is completed.

In the simple switching control, when the combustion mode switching flag becomes OFF (=0) at the time $t_1$, the negative overlap amount is decreased, the throttle opening degree is made small, the auxiliary fuel injection is stopped, the main fuel injection pulse width is increased, and the ignition is turned ON, in order to carry out the spark ignition type combustion.

On the other hand, in the case of applying the fuel mode switching control according to the present embodiment, when the switching flag becomes OFF (=0) at the time $t_1$, the negative overlap amount and the throttle opening degree are decreased. However, in order to enhance responsiveness of the intake amount, the throttle opening degree at that time is set at a value smaller than the target throttle opening degree of the spark ignition type combustion after switching. At the same time, the ignition is turned ON. In regard with the ignition timing, in order to suppress torque reduction due to reduction in the combustion stability and reduction in the combustion speed under the existence of a large mass of internal EGR, the ignition timing is made earlier than the target ignition timing of the spark ignition type combustion after switching. The auxiliary fuel injection is turned OFF, and the main fuel injection amount is increased. After a predetermined period (period A) elapses, the throttle and the ignition timing are set for the spark ignition type combustion, and the combustion switching control is finished.

Figure 9:
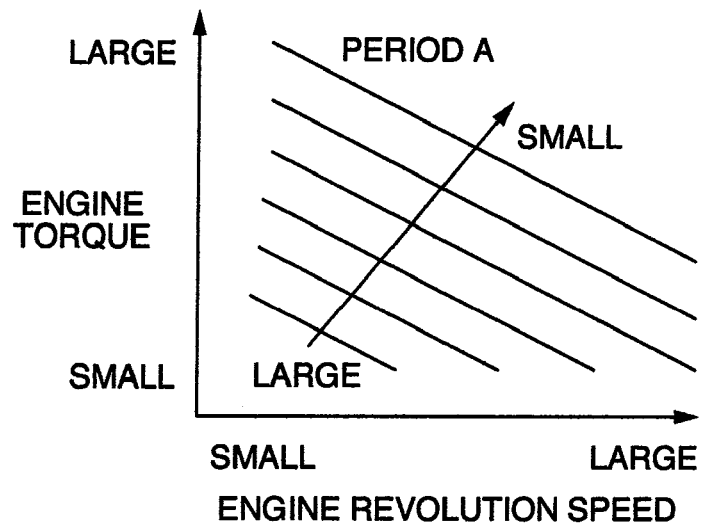
FIG. 9 is a map showing a period (period A) in which the throttle opening degree is made smaller than the target throttle opening degree of the spark ignition type combustion at the time of combustion switching in the first embodiment of the present invention.

At this time, the period (period A) in which the throttle opening degree is made smaller than the target throttle opening degree of the spark ignition type combustion after switching is a set value which is determined by a test or simulation in advance, and may differ in accordance with the operation conditions of the engine 100 as shown in FIG. 9, or may be determined based on the output results of the sensors detecting the mass of internal EGR in the cylinder 7 and the pressure in the intake pipe 6.

Figure 8:
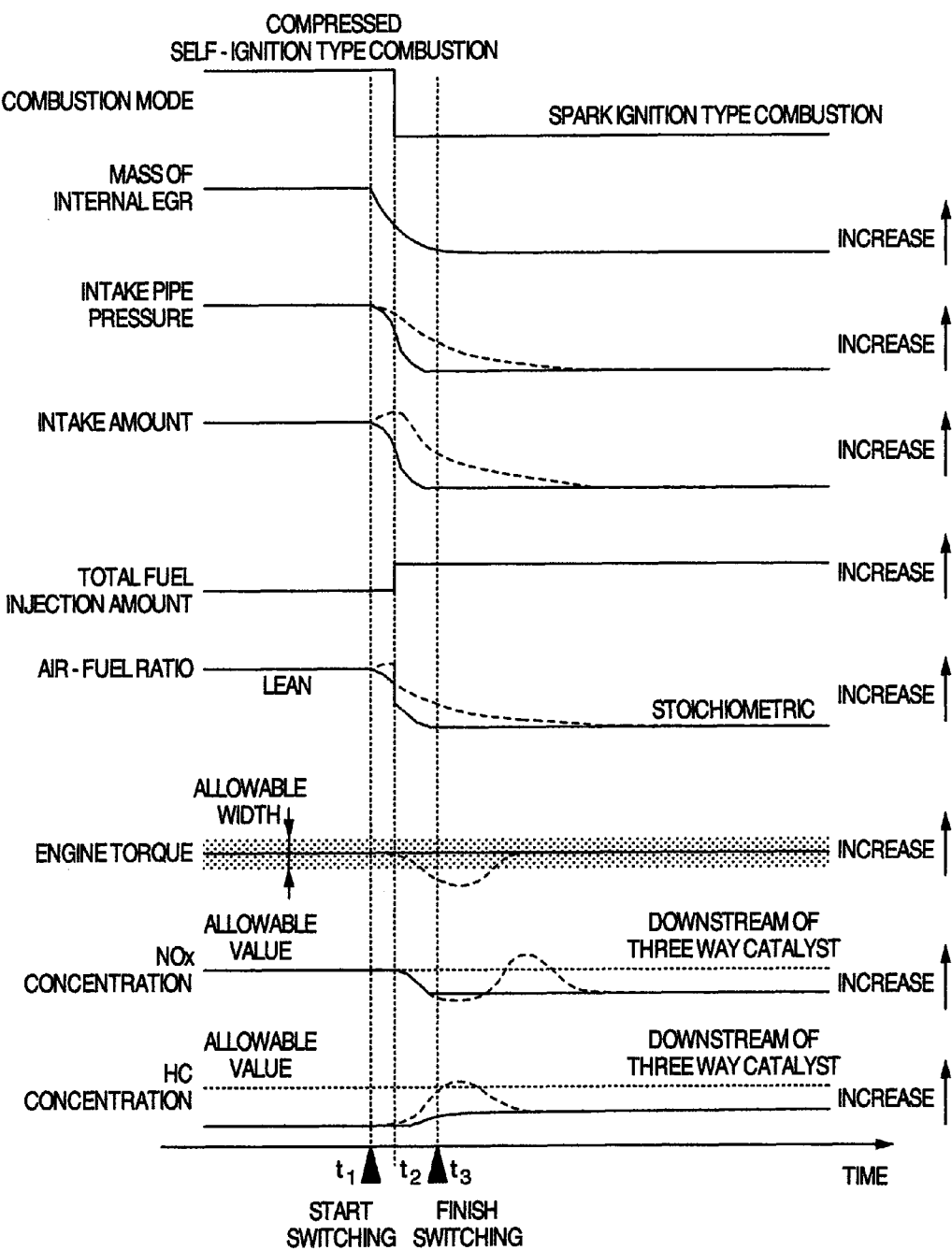
FIG. 8 is a time chart diagram of the combustion mode, the mass of internal EGR, the intake pipe pressure, the intake amount, the total fuel injection amount, the air-fuel ratio, the engine torque, the NOx concentration and the HC concentration when carrying out the switching of the combustion mode from the compressed self-ignition type combustion to the spark ignition type combustion in the first embodiment of the present invention.

FIG. 8 shows the time series of the combustion mode, the mass of internal EGR, the intake pipe pressure, the intake amount, the total fuel injection amount, the air-fuel ratio, the engine torque, the NOx concentration in the exhaust gas component, and the HC concentration when the fuel mode switching control from the compressed self-ignition type combustion to the spark ignition type combustion by the combustion mode switching part 20A is carried out (the combustion mode being the compressed self-ignition type combustion, the mass of internal EGR increasing, the intake pipe pressure increasing, the total fuel injection amount increasing, the air-fuel ratio increasing, the engine torque increasing, the NOx concentration increasing, and the HC concentration increasing are shown in order upward in the drawing). In FIG.

8, the broken line shows those at the time of applying the simple switching control, and the solid line shows those at the time of applying the combustion mode switching control of the present embodiment.

In the simple switching control, each of the manipulated variables is switched to the set value for realizing the spark ignition type combustion at the time $t_1$. According to this, the mass of internal EGR decreases, the intake pipe pressure decreases, the intake amount decreases, the total fuel injection amount increases and the air-fuel ratio decreases. However, even after the throttle opening degree is decreased in order to decrease the intake amount as described above, the intake pipe pressure does not decrease until the air remaining downstream of the throttle is taken into the engine, and a noticeable response delay occurs to the intake amount. Further, by the amount of decrease in the mass of internal EGR, fresh air easily enters the cylinder 7, and the intake amount temporally increases. For the above reason, it takes much time until the intake amount reaches the target intake amount of the spark ignition type combustion by simply switching each of the manipulated variables in the same timing. Therefore, the spark ignition type combustion is performed in an excessive air state, and torque variation due to misfire and increase in the HC concentration in the exhaust gas occur immediately after the switching. Further, since the engine goes through lean-burn for a long period after switching, the three way catalyst does not function during that period, and the NOx concentration in the exhaust increases.

In contrast to the aforementioned simple switching control, in the case in which the combustion mode switching control from the compressed self-ignition type combustion to the spark ignition type combustion is applied at the time $t_1$ by the combustion mode switching part 20A, the spark ignition type combustion is realized similarly by decreasing the mass of internal EGR, decreasing the intake pipe pressure, decreasing the intake amount, increasing the total fuel injection amount, and decreasing the air-fuel ratio, but by making the throttle opening degree smaller than the target throttle opening degree of the spark ignition type combustion after switching the throttle opening degree only for the predetermined period (period A), the intake pipe pressure is quickly reduced, and the responsiveness of the intake amount is enhanced. By this control, misfire and poor combustion in the spark ignition type combustion after combustion mode switching can be prevented. Therefore, variation in engine torque does not occur, and increase in the NOx concentration and HC concentration can be suppressed. Further, in such a system, a high-performance variable valve and a high-level control logic are not required, and therefore, cost can be reduced to be low. In addition, time required for the combustion switching control is reduced, and therefore, this can be matched with the operation or the like of a driver immediately after switching.

Figure 10:
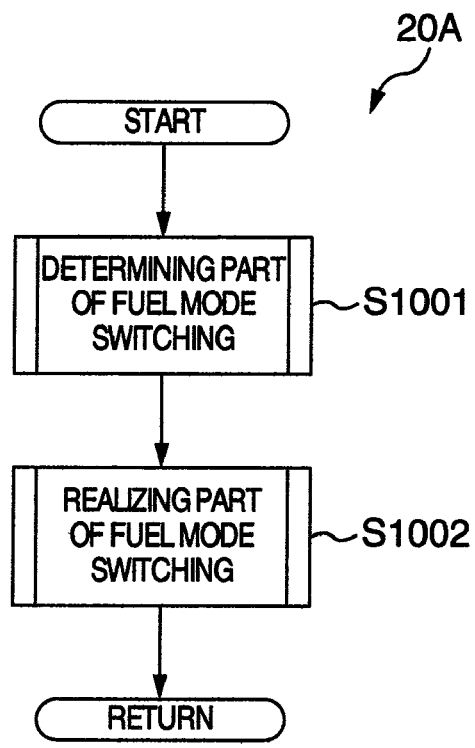
FIG. 10 is a flowchart showing the combustion mode switching part 20A in FIG. 2 in the first embodiment of the present invention.
Figure 11:
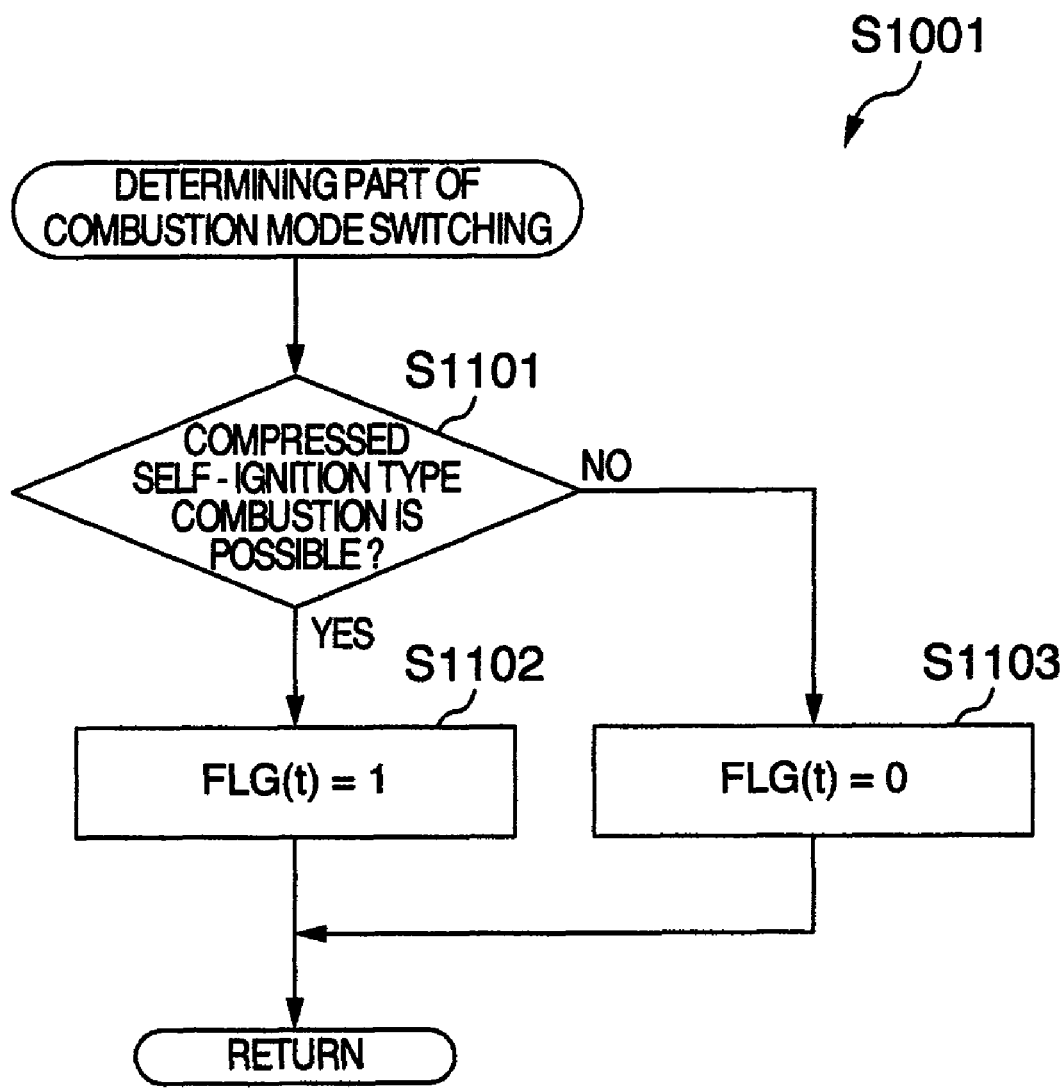
FIG. 11 is a flowchart showing a combustion mode switching means in FIG. 10 in the first embodiment of the present invention.
Figure 12:
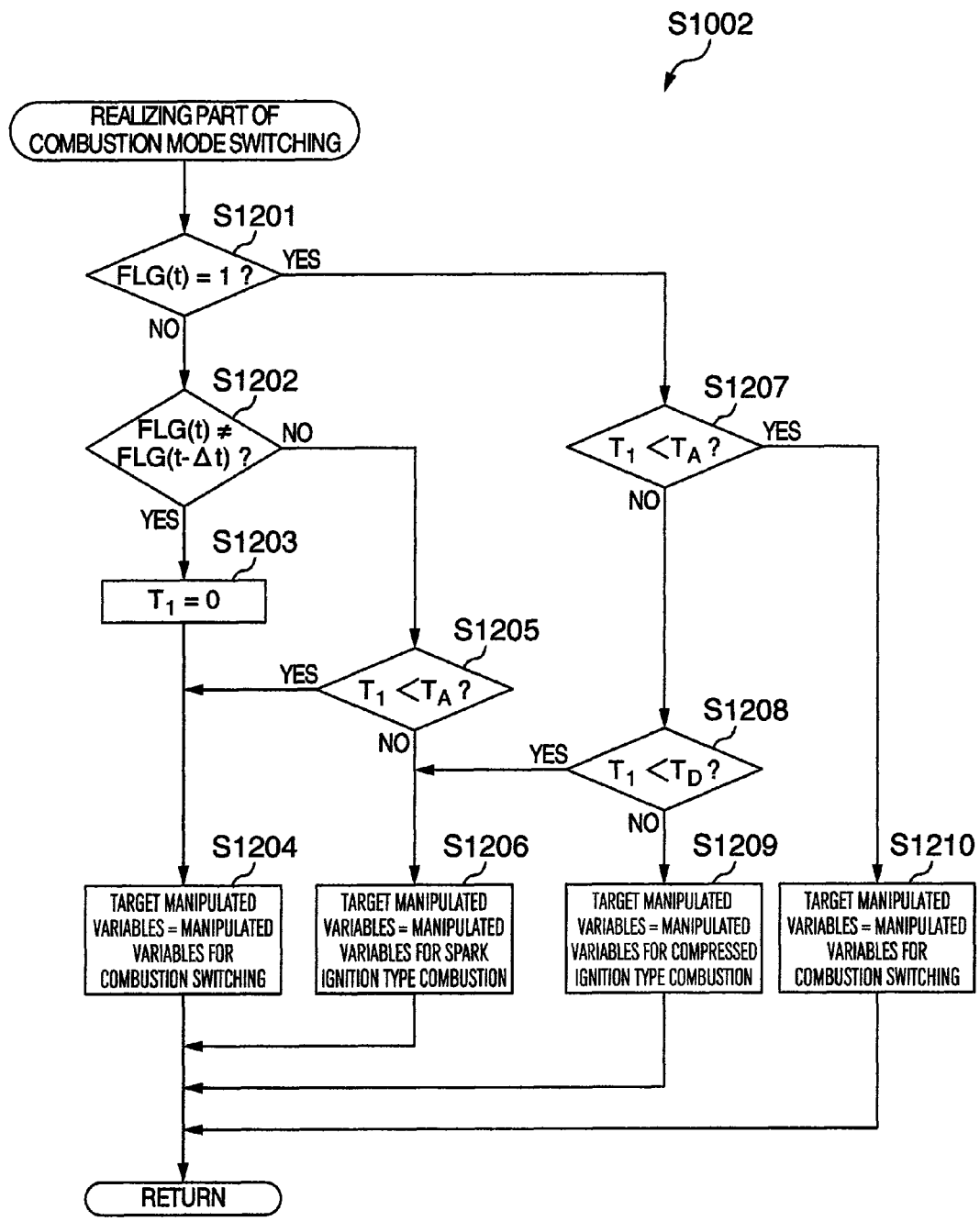
FIG. 12 is a flowchart showing a combustion mode switching realizing means in FIG. 10 in the first embodiment of the present invention.

FIGS. 10 to 12 are flowcharts of the combustion mode switching control by the combustion mode switching part 20A. FIG. 10 is the flowchart expressing the control block of FIG. 6. In step S1001, it is determined which is suitable for the present operation state, the spark ignition type combustion or the compressed self-ignition type combustion, and OFF (=0) or ON (=1) is set for the combustion mode switching flag FLG (t). Here, a variable t represents time. Further, in step S1002, in order to carry out the combustion mode switching flag FLG (t) which is the result of step S1001, the manipulated variables suitable for the selected combustion mode are set as the manipulated variables, the manipulated variables are switched so as to realize switching of the combustion mode while suppressing deterioration of the operation performance and the exhaust performance.

FIG. 11 is a flowchart of a combustion mode switching means of step S1001. In step S1101, the combustion state capable of being carried out is determined based on the map shown in FIG. 1 depending on the operation state determined by the required torque and engine revolution speed. In the case of the operation state in which the compressed self-ignition type combustion can be carried out, the flow goes to step S1102, and in the case of the operation state in which the spark ignition type combustion should be carried out, the flow goes to step S1103. In step S1102, in order to carry out the compressed self-ignition type combustion, ON (=1) is set for the combustion mode switching flag FLG (t), and a series of operations is finished. Further, in step S1103, in order to carry out the spark ignition type combustion, OFF (=0) is set for the combustion mode switching flag FLG (t), and a series of operations is finished.

FIG. 12 is a flowchart of a combustion mode switching realizing means S1002. In step S1201, it is determined whether the combustion mode switching flag FLG (t) which is set in step S1001 is ON (=1) or not. In the case of FLG (t)=0, that is, in the case of performing switching to the spark ignition type combustion, or continuing the spark ignition type combustion, the flow goes to step S1202. On the other hand, in the case of FLG (t)=1, that is, in the case of performing switching to the compressed self-ignition type combustion, or continuing the compressed self-ignition type combustion, the flow goes to step S1207.

First, the flowchart at and after step S1202 will be described. Step S1202 is a step of determining whether FLG (t) is switched at the present time t or not, that is, whether FLG (t) changes from the state FLG (t-Δt) which is earlier by a control period Δt and establishes FLG (t)=0 or not. When FLG (t) changes from FLG (t-Δt)=1 to FLG (t)=0, the flow goes to step S1203 to switch the combustion mode to the spark ignition type combustion from the compressed self-ignition type combustion. Further, when both the values of FLG (t-Δt) and FLG (t) are 0, switching from the compressed self-ignition type combustion to the spark ignition type combustion is continued. Alternatively, in order to continue the spark ignition type combustion, the flow goes to step S1205.

In step S1203, an output value $T_1$ of a timer for combustion switching control provided in the ECU 20 is set at zero. The timer indicates elapsed time after starting the combustion switching control from the compressed self-ignition type combustion to the spark ignition type combustion, and the combustion switching control is started from this point of time. Thereafter, the flow goes to step S1204.

In step S1204, in order to carry out switching to the spark ignition type combustion from the compressed self-ignition type combustion, the manipulated variables for combustion switching are set as the target manipulated variables to finish a series of operations.

In step S1205, it is determined whether the combustion switching control to the spark ignition type combustion from the compressed self-ignition type combustion is already completed or not. Specifically, when the elapsed time $T_1$ after starting the combustion switching control is smaller than a predetermined period $T_A$ (corresponding to the period A in FIG. 7) required for the combustion switching, it is determined that the combustion switching is under way at present, and in order to continue the combustion switching, the flow goes to step S1204. In step S1204, the manipulated variables for combustion switching are set as the target manipulated variables to finish a series of operations.

Meanwhile, when the elapsed time $T_1$ after starting the combustion switching control is larger than a predetermined period $T_A$ required for combustion switching, it is determined that the combustion switching is already completed, and in order to carry out the spark ignition type combustion, the flow goes to step S1206. In step S1206, the manipulated variables for the spark ignition type combustion are set as the target manipulated variables to finish a series of operations.

Next, a flowchart at or below step 1207 will be described.

The step 1207 and the following steps are the control for determining whether the present situation is the situation capable of switching to the compressed self-ignition type combustion, and avoiding switching to the compressed self-ignition type combustion under the situation in which the combustion in the engine is unstable.

In step S1207, it is determined whether or not the present situation is in the stage halfway through switching to the spark ignition type combustion from the compressed self-ignition type combustion.

When the elapsed time $T_1$ after starting the combustion switching control to the spark ignition type combustion from the compressed self-ignition type combustion is shorter than the predetermined period $T_A$ required for combustion switching, it is determined to be under the stage halfway through the combustion switching control to the spark ignition type combustion from the compressed self-ignition type combustion, and switching to the compressed self-ignition type combustion is not performed, but in order to continue combustion switching to the spark ignition type combustion, the flow goes to S1210. In step S1210, the manipulated variables for combustion switching are set as the target manipulated variables to finish a series of operations.

When the elapsed time $T_1$ after starting the combustion switching control to the spark ignition type combustion from the compressed self-ignition type combustion is longer than the predetermined period $T_A$ required for combustion switching, it is determined that switching to the spark ignition type combustion from the compressed self-ignition type combustion is already completed, and the flow goes to step S1208.

In step S1208, it is determined whether or not the present state is the spark ignition type combustion immediately after switching to the spark ignition type combustion from the compressed self-ignition type combustion.

When the elapsed time $T_1$ after starting the combustion switching control is shorter than a predetermined period $T_D$ which is the time from the start of the combustion switching control until stable spark ignition type combustion can be realized, it is determined that the present state is spark ignition type combustion under the unstable situation immediately after switching to the spark ignition type combustion from the compressed self-ignition type combustion, and switching to the compressed self-ignition type combustion is not performed, but in order to continue the spark ignition type combustion, the flow goes to S1206. In step S1206, the manipulated variables for the spark ignition type combustion are set as the target manipulated variables to finish a series of operations.

When the elapsed time $T_1$ after starting the combustion switching control is longer than the predetermined period $T_D$ which is the time from the start of the combustion switching control until stable spark ignition type combustion can be realized, it is determined that the present state is the compressed self-ignition type combustion or stable spark ignition type combustion, and in order to continue the compressed self-ignition type combustion, or carry out switching to the compressed self-ignition type combustion from the spark ignition type combustion, the flow goes to S1209. In step S1209, the manipulated variables for the compressed self-ignition type combustion are set as the target manipulated variables to finish a series of operations.

As described above, in the present embodiment, by conducting the combustion switching control basically so that the throttle opening degree at the stage halfway through the combustion switching to the spark ignition type combustion from the compressed self-ignition type combustion is made smaller than the throttle opening degree at the time of spark ignition, responsiveness of the intake air amount is improved, and quick combustion switching without torque variation and exhaust deterioration can be realized with the relatively simple control logic.

Next, a second embodiment of the present invention will be described hereinafter. The system configuration (see FIG. 2), the internal configuration of the ECU (see FIG. 5) and the function of the combustion switching determining part (see FIG. 11) of the internal combustion engine of the present embodiment are similar to those in the first embodiment, but only the function of the combustion mode switching realizing means differs.

Figure 13:
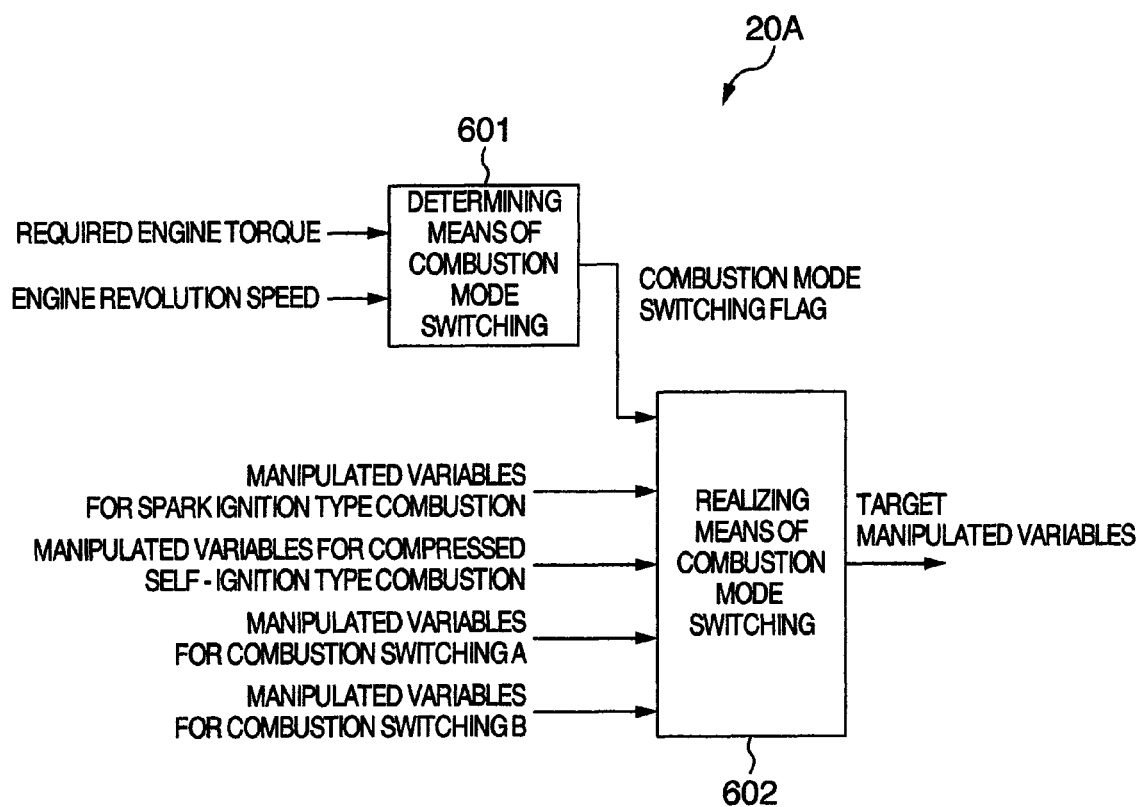
FIG. 13 is a control block diagram of the combustion mode switching part 20A in FIG. 2 in a second embodiment of the present invention.

FIG. 13 is a control block diagram of the combustion mode switching control by the combustion mode switching part 20A. The combustion mode switching part 20A includes the combustion mode switching determining means 601 and the combustion mode switching realizing means 602 which switches the manipulated variables of the engine 100 for switching the combustion mode.

The combustion mode switching determining means 601 has the same function as the combustion mode switching determining means 601 in the aforementioned first embodiment.

The combustion mode switching realizing means 602 determines the target manipulated variables for controlling the engine 100 based on the combustion mode switching flag which is the output of the combustion mode switching determining means 601. The target manipulated variables are selected from the manipulated variables for spark ignition type combustion, the manipulated variables for compressed self-ignition type combustion, combustion switching manipulated variables A and combustion switching manipulated variables B based on the combustion mode switching flag. More specifically, when the combustion mode switching flag is OFF (=0), the manipulated variables for spark ignition type combustion are set as the target manipulated variables in order to carry out the spark ignition type combustion. When the combustion mode switching flag is ON (=1), the manipulated variables for compressed self-ignition type combustion are set as the target manipulated variables in order to carry out the compressed self-ignition type combustion. Further, when the combustion mode switching flag is switched to OFF (=0) from ON (=1) while the compressed self-ignition type combustion is carried out, the combustion switching manipulated variables A are set as the target manipulated variables firstly, in order to switch the combustion mode to the spark ignition type combustion from the compressed self-ignition type combustion. After a predetermined period elapses, the combustion switching manipulated variables B are set as the target manipulated variables, and thereafter, the manipulated variables for spark ignition type combustion are set as the target manipulated variables.

Here, the above described manipulated variables includes the opening degree of the throttle 2 (throttle opening degree), the fuel injection pulse width and the fuel injection timing for the injector 3, the ignition timing for the ignition plug 4, the opening and closing timing of the intake valve 5a and the opening and closing timing of the exhaust valve 5b, which are manipulated when the engine 100 is controlled.

Figure 14:
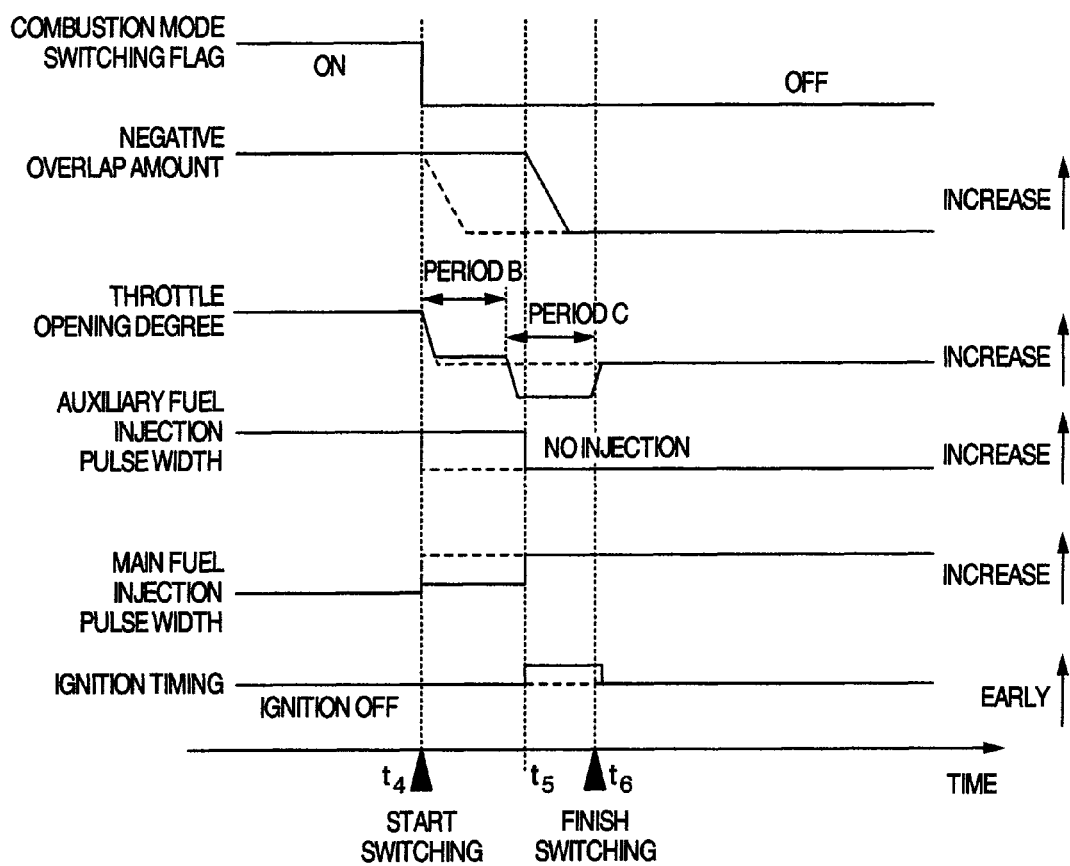
FIG. 14 is a time chart diagram of the combustion mode switching flag, the negative overlap amount, the throttle opening degree, the auxiliary fuel injection pulse width, the main fuel injection pulse width and the ignition signal when carrying out the switching of the combustion mode from the compressed self-ignition type combustion to the spark ignition type combustion in the second embodiment of the present invention.

FIG. 14 shows each of the manipulated variables at the time of carrying out the combustion mode switching control in the present embodiment along time sequence. Further, the broken line shows the case in which the manipulated variables are simply switched at the timing of a time $t_4$ at the time of switching to the compressed self-ignition type combustion from the spark ignition type combustion (simple switching control), whereas the solid line shows the case in which the combustion mode switching control of the present embodiment is applied. The time $t_4$ represents the time at which the combustion mode switching control is started from the compressed self-ignition type combustion, $t_5$ represents the time at which the combustion mode is switched to the spark ignition type combustion from the compressed self-ignition type combustion, that is, in the present embodiment, $t_5$ represents the time when the main fuel pulse width and auxiliary fuel pulse width are switched to the target values of the spark ignition type combustion, and $t_6$ represents the time at which a series of combustion switching controls to the spark ignition type combustion is completed.

In the simple switching control, when the combustion mode switching flag becomes OFF (=0) at the time $t_1$, the negative overlap amount is decreased, the throttle opening degree is made small, the auxiliary fuel injection is stopped, the main fuel injection pulse width is increased, and ignition is turned ON, in order to carry out the spark ignition type combustion.

In the case in which the combustion mode switching control according to the present embodiment is applied, when the switching flag becomes OFF (=0) at the time $t_4$, the throttle opening degree is firstly decreased to decrease the intake amount, and the compressed self-ignition type combustion is performed in the state with the air-fuel ratio smaller than usual (the state close to a stoichiometric mixture ratio). At that time, in order to compensate torque reduction due to the pump loss caused by decrease in the throttle opening degree, the main fuel injection amount is slightly increased. After a predetermined period (period B) elapses, the negative overlap amount is decreased in order to switch the combustion state to the spark ignition type combustion, and in order to suppress increase in intake amount which is caused due to decrease in mass of internal EGR accompanying that, the throttle opening degree is decreased. The throttle opening degree at this time is set at a value smaller than the target throttle opening degree of the spark ignition type combustion after switching. At the same time, ignition is turned ON, and in order to suppress torque reduction due to reduction in combustion stability and reduction in combustion speed under the existence of a large mass of internal EGR, the ignition timing is made earlier than the target ignition timing of the spark ignition type combustion after switching. The auxiliary fuel injection is turned OFF, and the main fuel injection amount is increased. After a predetermined period (period C) elapses, the throttle and ignition timing are set for the spark ignition type combustion, and the combustion switching control is finished.

At this time, the period (period B) in which the compressed self-ignition type combustion is performed in the state with an air-fuel ratio smaller than usual (the state close to the stoichiometric mixture ratio) and the period (period C) in which the throttle opening degree is made smaller than the target throttle opening degree at the time of spark ignition type combustion are the set values which are determined by a test or simulation in advance, and may differ depending on the operation conditions of the engine 100, or may be determined based on the output results of the sensors which detect the mass of internal EGR in the cylinder 7 and the pressure inside the intake pipe 6.

Figure 15:
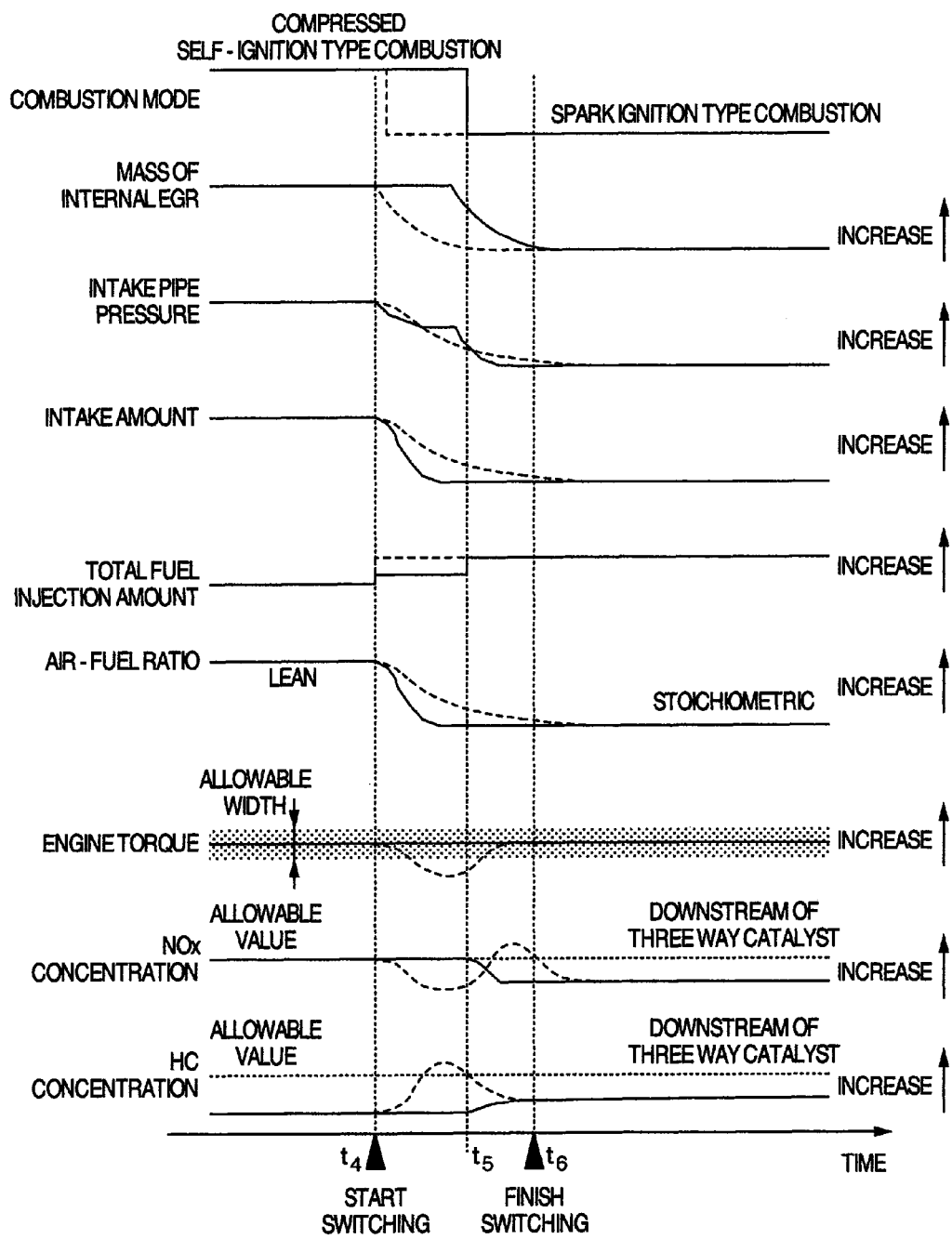
FIG. 15 is a time chart diagram of the combustion mode, the mass of internal EGR, the intake pipe pressure, the intake amount, the total fuel injection amount, the air-fuel ratio, the engine torque, the NOx concentration and HC concentration when carrying out the switching of the combustion mode from the compressed self-ignition type combustion to the spark ignition type combustion in the second embodiment of the present invention.

FIG. 15 shows the time series of the combustion mode, the mass of internal EGR, the intake pipe pressure, the intake amount, the total fuel injection amount, the air-fuel ratio, the engine torque, and the NOx concentration and HC concentration in the exhaust gas component at the time of carrying out the combustion mode switching control from the compressed self-ignition type combustion to the spark ignition type combustion by the combustion mode switching part 20A. In FIG. 15, the broken line shows the case in which the simple switching control is applied, whereas the solid line shows the case in which the combustion mode switching control of the present embodiment is applied.

The result of applying the simple switching control is the same as that in FIG. 8.

When the combustion mode switching control from the compressed self-ignition type combustion to the spark ignition type combustion is applied at the time $t_4$ by the combustion mode switching part 20A, the intake pipe pressure is decreased by making the throttle opening degree small to reduce the intake amount, the air-fuel ratio is brought into the state close to the stoichiometric mixture ratio, and the compressed self-ignition type combustion is carried out. After the predetermined period (period B) elapses, the mass of internal EGR is decreased, and the total fuel injection amount is increased, whereby the spark ignition type combustion is realized. At this time, by making the throttle opening degree smaller than the target throttle opening degree of the spark ignition type combustion only for a predetermined period (period C), the intake pipe pressure is quickly reduced, and increase in intake amount by decrease in the mass of internal EGR is suppressed. By this control, the transient state of the intake flow rate at the time of combustion mode switching is suppressed to a minimum, and misfire and poor combustion can be prevented. Therefore, variation in the engine torque does not occur, and increase in NOx concentration and HC concentration can be further suppressed.

Figure 16:
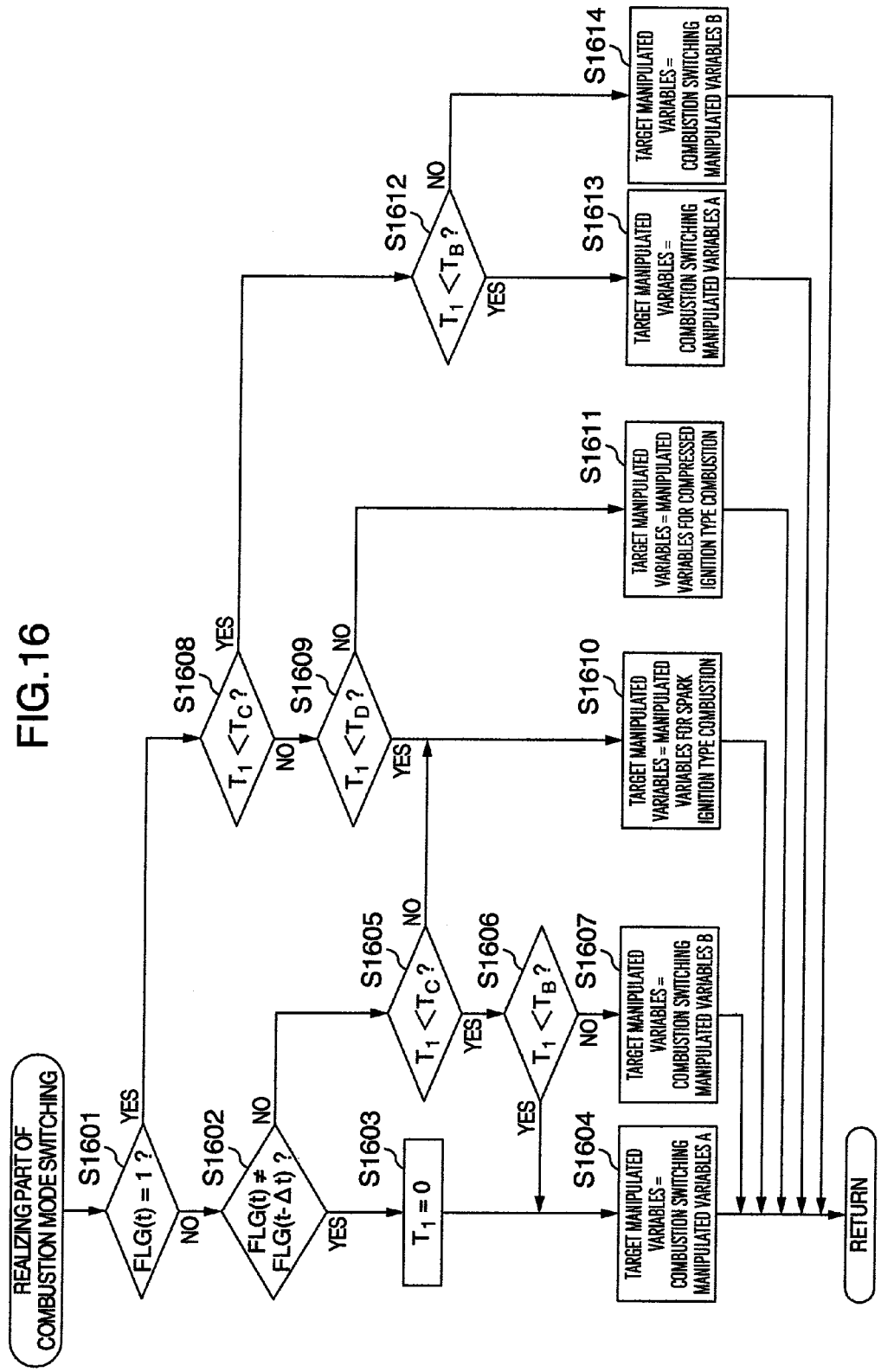
FIG. 16 is a flowchart showing the combustion mode switching realizing means in FIG. 10 in the second embodiment of the present invention.

FIG. 16 is a flowchart of the combustion mode switching realizing means 602 in the present embodiment. In step S1601, it is determined whether the combustion mode switching flag FLG (t) which is set in step S1001 is ON (=1) or not. In the case of FLG (t)=0, that is, in the case of carrying out switching to the spark ignition type combustion, or continuing the spark ignition type combustion, the flow goes to step S1602. On the other hand, in the case of FLG (t)=1, that is, in the case of carrying out switching to the compressed self-ignition type combustion, or continuing the compressed self-ignition type combustion, the flow goes to step S1608.

First, the flowchart from step S1602 will be described. Step S1602 is a step of determining whether FLG (t) is switched at the present time t or not, that is, whether FLG (t) changes from the state of FLG (t-Δt) which is an earlier state by a control period Δt to establish FLG (t)=0 or not. When FLG (t) changes from FLG (t-Δt)=1 to FLG (t)=0, the flow goes to step S1603, in order to switch the combustion mode to the spark ignition type combustion from the compressed self-ignition type combustion. When both values of FLG (t-Δt) and FLG (t) are zero, in order to continue switching from the compressed self-ignition type combustion to the spark ignition type combustion, or, in order to continue the spark ignition type combustion, the flow goes to step S1605.

In step S1603, an output value $T_1$ of a timer for combustion switching control included in the ECU 20 is set to zero. The timer indicates the elapsed time after starting the combustion switching control from the compressed self-ignition type combustion to the spark ignition type combustion, and from this point of time, the combustion switching control is started. Thereafter, the flow goes to step S1604.

In step S1604, in order to carry out switching from the compressed self-ignition type combustion to the spark ignition type combustion, the combustion switching manipulated variables A are set as the target manipulated variables to finish a series of operations.

In step S1605, it is determined whether the combustion switching control from the compressed self-ignition type combustion to the spark ignition type combustion is already completed or not. Specifically, when the elapsed time $T_1$ after starting the combustion switching control is shorter than a predetermined period $T_C$ (corresponding to the sum of the period B and period C in FIG. 14) required for the combustion switching, it is determined that the combustion switching is under way at present, and in order to continue the combustion switching, the flow goes to step S1606.

When the elapsed time $T_1$ after starting the combustion switching control is longer than the predetermined period $T_C$ required for combustion switching, it is determined that the combustion switching is already completed, and the manipulated variables for spark ignition type combustion are set as the target manipulated variables to finish a series of operations.

In step S1606, it is determined which stage of the combustion switching the present situation is in. When the elapsed time $T_1$ after starting the combustion switching control is shorter than the period $T_B$ (corresponding to the period B in FIG. 14) in which the compressed self-ignition type combustion in the state with a low air-fuel ratio (close to the stoichiometric mixture ratio) is carried out, the combustion switching manipulated variables A are set as the target manipulated variables, in order to carry out the compressed self-ignition type combustion in the state with a low air-fuel ratio (the state close to the stoichiometric mixture ratio), and a series of operations is finished. When the elapsed time $T_1$ after starting the combustion switching control is longer than the period $T_B$ in which the compressed self-ignition type combustion in the state with a low air-fuel ratio (close to the stoichiometric mixture ratio) is carried out, the combustion switching manipulated variables B are set as the target manipulated variables, in order to carry out switching to the spark ignition type combustion, and a series of operations is finished.

Next, a flowchart of the steps at and below step 1608 will be described.

The step 1608 and the following steps are the control for determining whether the present situation is the situation capable of switching to the compressed self-ignition type combustion, and avoiding switching to the compressed self-ignition type combustion from the situation in which the combustion in the engine is unstable.

In step S1608, it is determined whether or not the present situation is in the stage halfway through switching to the spark ignition type combustion from the compressed self-ignition type combustion.

When the elapsed time $T_1$ after starting the combustion switching control from the compressed self-ignition type combustion to the spark ignition type combustion is shorter than the predetermined period $T_C$ required for combustion switching, it is determined that the present state is in the stage halfway through the combustion switching control from the compressed self-ignition type combustion to the spark ignition type combustion, and switching to the compressed self-ignition type combustion is not carried out, but in order to continue the combustion switching to the spark ignition type combustion, the flow goes to S1612.

When the elapsed time $T_1$ after starting the combustion switching control from the compressed self-ignition type combustion to the spark-ignition type combustion is longer than the predetermined period $T_C$ required for combustion switching, it is determined that switching to the spark ignition type combustion from the compressed self-ignition type combustion is already completed, and the flow goes to step S1609.

In step S1612, it is determined which stage of the combustion switching the present state is in. When the elapsed time $T_1$ after starting the combustion switching control is shorter than the period $T_B$ in which the compressed self-ignition type combustion in the state with a low air-fuel ratio (close to the stoichiometric mixture ratio) is carried out, the flow goes to step S1613, and in order to carry out the compressed self-ignition type combustion in the state with a low air-fuel ratio (close to the stoichiometric mixture ratio), the combustion switching manipulated variables A are set as the target manipulated variables to finish a series of operations. When the elapsed time $T_1$ after starting the combustion switching control is longer than the period $T_B$ in which the compressed self-ignition type combustion in the state with a low air-fuel ratio (close to the stoichiometric mixture ratio) is carried out, the flow goes to step S1614, and in order to carry out switching to the spark ignition type combustion, the combustion switching manipulated variables B are set as the target manipulated variables to finish a series of operations.

In step S1609, it is determined whether the present state is the spark ignition type combustion immediately after switching from the compressed self-ignition type combustion to the spark ignition type combustion or not.

When the elapsed time $T_1$ after starting the combustion switching control is shorter than the predetermined period $T_D$ which is the time from the start of the combustion switching control until stable spark ignition type combustion can be realized, it is determined that the present state is the spark ignition type combustion under the unstable situation immediately after switching from the compressed self-ignition type combustion to the spark ignition type combustion, and switching to the compressed self-ignition type combustion is not carried out, but in order to continue the spark ignition type combustion, the flow goes to S1610. In step S1610, the manipulated variables for spark ignition type combustion are set as the target manipulated variables to finish a series of operations.

When the elapsed time $T_1$ after starting the combustion switching control is longer than the predetermined period $T_D$ from the start of the combustion switching control until stable spark ignition type combustion can be realized, it is determined that the present state is compressed self-ignition type combustion or stable spark ignition type combustion, and in order to continue the compressed self-ignition type combustion, or carry out switching to the compressed self-ignition type combustion from the spark ignition type combustion, the flow goes to S1611. In step S1611, the manipulated variables for the compressed self-ignition type combustion are set as the target manipulated variables to finish a series of operations.

As described above, in the present embodiment, by conducting the combustion switching control on the basis that the intake amount and the intake pipe pressure are made small in advance by carrying out the compressed self-ignition type combustion firstly in the state close to the stoichiometric mixture ratio halfway through the combustion switching from the compressed self-ignition type combustion to the spark ignition type combustion, and thereafter, the throttle opening degree is made smaller than the throttle opening degree at the time of spark ignition type combustion, the transient change of the intake pipe pressure and the intake amount in the spark ignition type combustion immediately after the combustion switching is made small, and the risk of torque variation and exhaust deterioration at the time of combustion switching can be suppressed to a minimum.

The two embodiments of the present invention are described in detail above, but the present invention is not limited to the above described embodiments, and various modifications in design can be made in the scope without departing from the spirit of the invention described in the claims.

For example, in the combustion mode switching determining means 601, it may be determined whether switching between the spark ignition type combustion and the compressed self-ignition type combustion is possible or not based on not only the required torque and the engine revolution speed, but also at least one of output signals of the sensors directly or indirectly detecting the water temperature, exhaust temperature, intake air temperature and combustion temperature.

Further, in order to prevent reduction in torque under excessive air or under the existence of a large mass of internal EGR at the time of combustion switching from the compressed self-ignition type combustion to the spark ignition type combustion, the fuel injection amount may be increased during combustion switching control or in the spark ignition type combustion immediately after the combustion switching control.

Further, at the time of the combustion switching control from the compressed self-ignition type combustion to the spark ignition type combustion, the intake amount is controlled to be an optimal intake amount by making the lift amount of the intake valve small, and torque variation and exhaust deterioration can be suppressed.

Further, at the time of shifting from normal compressed self-ignition type combustion to the compressed self-ignition type combustion in the state with a low air-fuel ratio, by providing the period in which the throttle opening degree is made smaller than the target throttle opening degree in the compressed self-ignition type combustion in the state with a low air-fuel ratio, the responsiveness of the intake amount is enhanced, and the combustion state can be quickly shifted to the compressed self-ignition type combustion in the state with a low air-fuel ratio.

The invention claimed is:

1. A controller for controlling a throttle opening degree of an internal combustion engine, the controller being capable of switching a combustion mode of the internal combustion engine from compressed self-ignition type combustion to spark ignition type combustion, wherein within a predetermined period of applying a fuel mode switching control to change from the compressed self-ignition type combustion to the spark ignition type combustion, said controller decreases the throttle opening degree of the internal combustion engine from a throttle opening degree for the compressed self-ignition type combustion below a throttle opening degree subsequently set by the controller when the compressed self-ignition type combustion has switched to the spark ignition type combustion, and then increases said throttle opening degree of said internal combustion engine to said throttle opening degree of said internal combustion engine to said throttle opening degree subsequently set by the controller after the predetermined time has passed for said spark ignition type combustion.

2. The controller according to claim 1, wherein the throttle opening degree is controlled so as to be said subsequently set throttle opening degree only after a lapse of said predetermined period.

3. The controller according to claim 1, wherein within the predetermined period, switching from the spark ignition type combustion to the compressed self-ignition type combustion is inhibited.

4. The controller according to claim 1, wherein the length of the predetermined period is determined based on engine torque and engine speed.

5. The controller according to claim 1, wherein the length of the predetermined period is determined based on a result of detecting at least one of a mass of internal EGR, intake pipe pressure, intake air amount, intake air temperature and water temperature of the internal combustion engine.

6. The controller according to claim 1, wherein the controller decreases the opening degree below said subsequently set throttle opening degree in multiple steps.

\* \* \* \* \*